US 9,667,831 B2

(12) United States Patent
Kobayashi

(10) Patent No.: US 9,667,831 B2
(45) Date of Patent: May 30, 2017

(54) INFORMATION PROCESSING APPARATUS, PRINTING METHOD, AND NON-TRANSITORY COMPUTER-READABLE RECORDING MEDIUM FOR GENERATING PRINT DATA CORRESPONDING TO A DISPLAY IMAGE

(71) Applicant: Konica Minolta, Inc., Chiyoda-ku, Tokyo (JP)

(72) Inventor: Minako Kobayashi, Ikeda (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 14/939,261

(22) Filed: Nov. 12, 2015

(65) Prior Publication Data
US 2016/0142582 A1 May 19, 2016

(30) Foreign Application Priority Data

Nov. 13, 2014 (JP) ................... 2014-230733

(51) Int. Cl.
*H04N 1/393* (2006.01)
*H04N 1/40* (2006.01)
*H04N 1/00* (2006.01)

(52) U.S. Cl.
CPC ......... *H04N 1/393* (2013.01); *H04N 1/00456* (2013.01); *H04N 1/00464* (2013.01); *H04N 1/3935* (2013.01)

(58) Field of Classification Search
None
See application file for complete search history.

(56) References Cited

U.S. PATENT DOCUMENTS

| 8,891,109 B2 * | 11/2014 | Hasegawa | H04N 1/0044 347/251 |
| 2004/0019628 A1 | 1/2004 | Puri et al. | |
| 2005/0286100 A1 * | 12/2005 | Uotani | G06F 3/1205 358/527 |
| 2008/0030523 A1 * | 2/2008 | Takami | H04N 1/38 345/619 |

(Continued)

FOREIGN PATENT DOCUMENTS

| JP | 2007025771 A | 2/2007 |
| JP | 2008139981 A | 6/2008 |

(Continued)

*Primary Examiner* — Ming Hon
(74) *Attorney, Agent, or Firm* — Cantor Colburn LLP

(57) ABSTRACT

A controller of an information processing apparatus executes the steps of: generating a display image based on a page from a server; displaying the display image; generating print data for printing the display image; identifying whether a first display image is of the first kind; and determining whether an operation for enlarging or reducing the first display image is accepted. The print data generating step includes the steps of: generating print data for printing a second display image of the second kind corresponding to the first display image, if the first display image is of the first kind, or if the first display image is not of the first kind and an operation for enlarging or reducing is not accepted; and generating print data for printing the first display image if the first display image is not of the first kind and an operation for enlarging or reducing is accepted.

12 Claims, 9 Drawing Sheets

(56) References Cited

U.S. PATENT DOCUMENTS

| | | | |
|---|---|---|---|
| 2008/0150952 A1 | 6/2008 | Koarai | |
| 2010/0014103 A1* | 1/2010 | Lee | G06K 15/02 |
| | | | 358/1.9 |
| 2010/0309497 A1* | 12/2010 | Oikawa | G06F 3/1204 |
| | | | 358/1.9 |
| 2011/0222104 A1* | 9/2011 | Mohammad | G06F 3/1206 |
| | | | 358/1.15 |
| 2013/0100463 A1* | 4/2013 | Park | G06F 3/1211 |
| | | | 358/1.2 |
| 2013/0208302 A1* | 8/2013 | Tanaka | H04N 1/00228 |
| | | | 358/1.15 |
| 2014/0362402 A1* | 12/2014 | Tsuboi | H04N 1/00411 |
| | | | 358/1.15 |

FOREIGN PATENT DOCUMENTS

| | | |
|---|---|---|
| JP | 2009054175 A | 3/2009 |
| JP | 2013161196 A | 8/2013 |

* cited by examiner

INFORMATION PROCESSING APPARATUS, PRINTING METHOD, AND NON-TRANSITORY COMPUTER-READABLE RECORDING MEDIUM FOR GENERATING PRINT DATA CORRESPONDING TO A DISPLAY IMAGE

CROSS REFERENCE TO RELATED APPLICATIONS

The present invention claims priority under 35 U.S.C. §119 to Japanese Application No. 2014-230733 filed Nov. 13, 2014, the entire content of which is incorporated herein by reference.

BACKGROUND OF THE INVENTION

Field of the Invention

The present invention relates to an information processing apparatus, a web page printing method, and a non-transitory computer-readable recording medium encoded with a browsing program. More specifically, the present invention relates to an information processing apparatus having a browsing function, a printing method performed in the information processing apparatus, and a non-transitory computer-readable recording medium encoded with a browsing program.

Description of the Related Art

Some of recent image forming apparatuses such as Multi-Function Peripherals (hereinafter referred to as "MFPs") are loaded with browsing programs to serve the browsing function of downloading a web page from a web server and displaying the web page. Servers may provide a web page most suitable for the device that displays the web page. For example, a web page for personal computers (hereinafter referred to as "PCs") and a web page for mobile terminals having display surfaces smaller than the display surfaces of PCs are prepared in advance, so that the web page for PCs is transmitted in response to a request from a PC, and the web page for mobile terminals is transmitted in response to a request from a mobile terminal. When an image forming apparatus prints a web page, the web page rendered for display is printed. For example, when a web page for mobile terminals appears, the image of the web page for mobile terminals is printed on paper. In this case, a large margin is left on paper.

Japanese Patent Laid-Open No. 2009-054175 discloses a computer-implemented method for rendering content described by a content description, the method comprising: (A) providing the content description and an output device description to a web browser display rendering engine to generate rendered content suitable for output by a printer, the rendered content comprising a raster image, wherein the output device description describes the printer according to at least one input parameter of the web browser display rendering engine.

The method disclosed in Japanese Patent Laid-Open No. 2009-054175 uses the output device description in addition to the content description, and the he output device description for an output device should be prepared. It is sometimes difficult to set the output device description, and the operation of selecting the output device description is required.

SUMMARY OF THE INVENTION

An information processing apparatus according to an aspect of the present invention includes an operation accepting unit to accept an operation by a user, a display unit to display an image, and a controller. The controller includes: a page acquiring unit configured to request a server to transmit a page written in a data description language and acquire a page from the server, a generating unit configured to generate a display image based on the page acquired from the server, a display control unit configured to display the generated display image on the display unit, a print control unit configured to generate print data for printing the display image generated by the generating unit, if the operation accepting unit accepts a print instruction, an identifying unit configured to identify whether a first display image appearing on the display unit at a point of time when the operation accepting unit accepts a print instruction is of a first kind, based on a page corresponding to the first display image, and an operation determining unit configured to determine whether the operation accepting unit accepts an operation of giving an instruction to enlarge or reduce the first display image while the first display image appears on the display unit. The print control unit is configured to generate print data for printing a second display image that corresponds to the first display image and is of a second kind different from the first kind, if the identifying unit identifies the first display image as the first kind, or if the identifying unit does not identify the first display image as the first kind and the operation determining unit determines that an operation of giving an instruction to enlarge or reduce the first display image is not accepted, and to generate print data for printing the first display image, if the identifying unit does not identify the first display image as the first kind and the operation determining unit determines that an operation of giving an instruction to enlarge or reduce the first display image is accepted.

A printing method according to another aspect is performed in a processing apparatus. The processing apparatus includes an operation accepting unit to accept an operation by a user and a display unit to display an image. The method includes: a page acquiring step of requesting a server to transmit a page written in a data description language and acquiring a page from the server; a generating step of generating a display image based on the page acquired from the server; a display control step of displaying the generated display image on the display unit; a print control step of generating print data for printing the display image generated in the generating step if the operation accepting unit accepts a print instruction; an identifying step of identifying whether a first display image appearing on the display unit at a point of time when the operation accepting unit accepts a print instruction is of a first kind, based on a page corresponding to the first display image; and an operation determining step of determining whether the operation accepting unit accepts an operation of giving an instruction to enlarge or reduce the first display image while the first display image appears on the display unit. The print control step includes a step of generating print data for printing a second display image that corresponds to the first display image and is of a second kind different from the first kind, if the first display image is identified as the first kind in the identifying step, or if the first display image is not identified as the first kind in the identifying step and it is determined that an operation of giving an instruction to enlarge or reduce the first display image is not accepted in the operation determining step, and a step of generating print data for printing the first display image, if the first display image is not identified as the first kind in the identifying step and it is determined that an operation of giving an instruction to enlarge or reduce the first display image is accepted in the operation determining step.

A non-transitory computer-readable recording medium according to a further aspect of the present invention is encoded with a browsing program executable on a computer for controlling an information processing apparatus. The information processing apparatus includes an operation accepting unit to accept an operation by a user and a display unit to display an image. The program causes the computer to perform: a page acquiring step of requesting a server to transmit a page written in a data description language and acquiring a page from the server; a generating step of generating a display image based on the page acquired from the server; a display control step of displaying the generated display image on the display unit; a print control step of generating print data for printing the display image generated in the generating step, if the operation accepting unit accepts a print instruction; an identifying step of identifying whether a first display image appearing on the display unit at a point of time when the operation accepting unit accepts a print instruction is of a first kind, based on a page corresponding to the first display image; and an operation determining step of determining whether the operation accepting unit accepts an operation of giving an instruction to enlarge or reduce the first display image while the first display image appears on the display unit. The print control step includes a step of generating print data for printing a second display image that corresponds to the first display image and is of a second kind different from the first kind, if the first display image is identified as the first kind in the identifying step, or if the first display image is not identified as the first kind in the identifying step and it is determined that an operation of giving an instruction to enlarge or reduce the first display image is not accepted in the operation determining step, and a step of generating print data for printing the first display image, if the first display image is not identified as the first kind in the identifying step and it is determined that an operation of giving an instruction to enlarge or reduce the first display image is accepted in the operation determining step.

The foregoing and other features, aspects, and advantages of the present invention will become more apparent from the following detailed description of the present invention when taken in conjunction with the accompanying drawings.

DESCRIPTION OF THE PREFERRED EMBODIMENTS

Embodiments of the present invention will be described below in conjunction with the figures. In the following description, the same parts are denoted with the same reference signs. Their names and functions are also the same. A detailed description thereof is not repeated.

Figure 1:
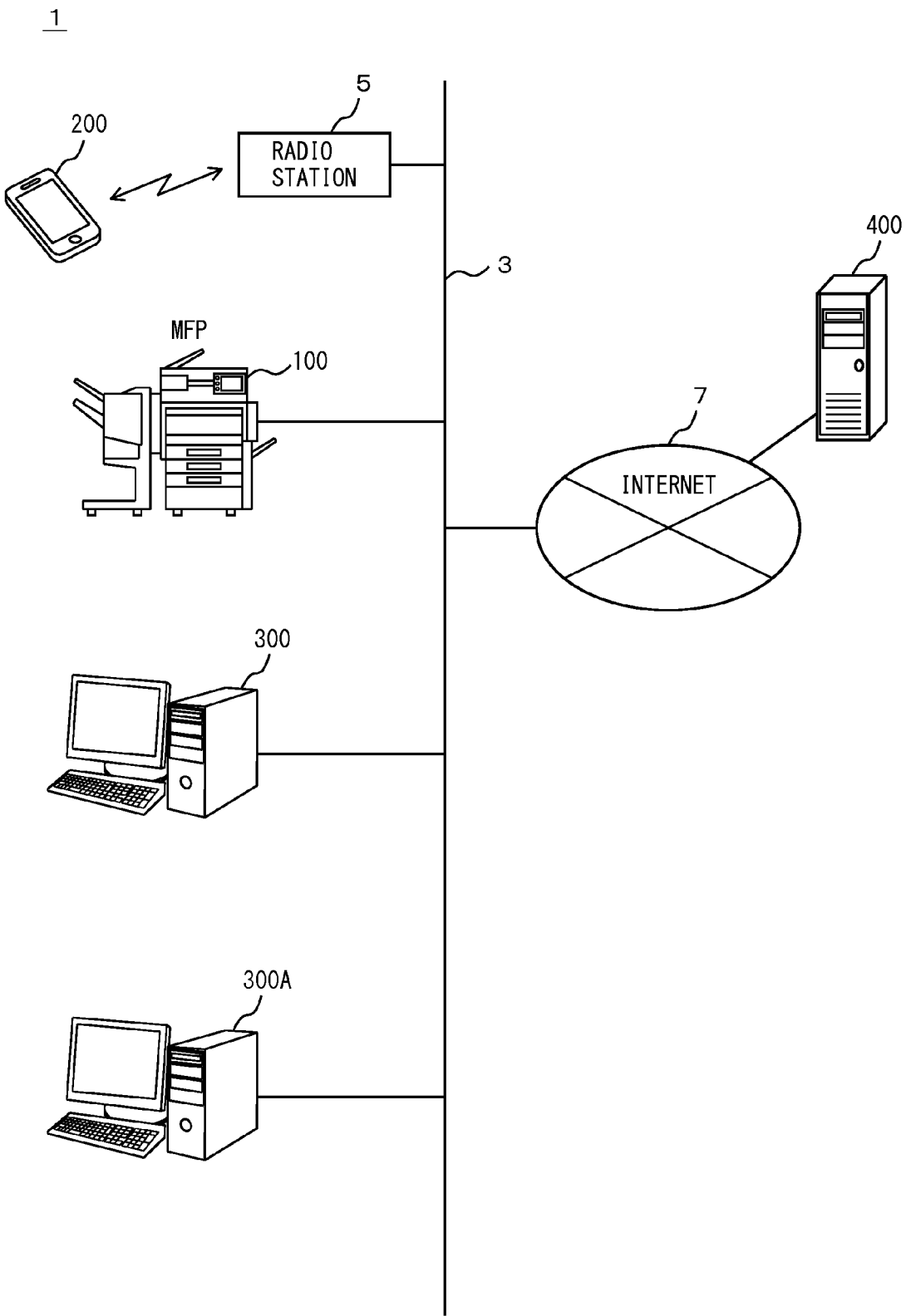
FIG. 1 is a diagram showing the overview of an image forming system in an embodiment of the present invention.

FIG. 1 is a diagram showing the overview of an image forming system in an embodiment of the present invention. Referring to FIG. 1, an image forming system 1 includes a Multi-Function Peripheral (hereinafter referred to as "MFP") 100, a portable information device 200, personal computers (hereinafter referred to as "PCs") 300, 300A, and a radio station 5, each being connected to a network 3. MFP 100 thus can communicate with PCs 300, 300A and radio station 5 through network 3.

Although a single MFP connected to network 3 is shown as an example of the information processing apparatus, the number of MFPs may be one or more. MFP 100 may be replaced by any other devices having the function of processing images, for example, such as computers, facsimiles, and printers.

Network 3 is a Local Area Network (LAN), either wired or wireless. Network 3 is connected to the Internet 7. MFP 100 thus can communicate with a server 400 connected to the Internet 7. Network 3 may not be a LAN but may be a Wide Area Network (WAN) or a network using the Public Switched Telephone Network (PSTN).

Portable information device 200 is another example of the information processing apparatus and is a Personal Digital Assistant (PDA) such as a smartphone or an electronic paper having the communication function. Here, portable information device 200 is a smartphone by way of example. Portable information device 200 communicates by radio with a mobile phone base station to connect to a mobile phone network to make a call. Portable information device 200 also has the wireless LAN function.

Network 3 is further connected with radio station 5. Radio station 5 is a relay device for network 3 and communicates with portable information device 200 having the wireless LAN communication function to connect portable information device 200 to network 3. Portable information device 200 thus can transmit/receive data to/from MFP 100 and PCs 300, 300A connected to network 3.

In image forming system 1 in the present embodiment, server 400 functions as a web server. The hardware configuration and functions of server 400 are well known, and a detailed description thereof is not repeated here. In response to receiving a page-transmission request command from any of MFP 100, portable information device 200, and PCs 300, 300A loaded with a browsing program, server 400 sends back a web page corresponding to the page-transmission request command. The web page is written in a page description language such as a markup language. The page-transmission request command is, for example, a GET command in the HTTP (HyperText Transfer Protocol) protocol. The page-transmission request command includes a URL (Uniform Resource Locator) for specifying a web page. Server 400 here provides a web page of the first kind and a web page of the second kind having the same URL. If a user agent is described in the HTTP header of the GET command, the redirect function is used to send back one of a web page of the first kind and a web page of the second kind that corresponds to the user agent. The web page of the first kind is a web page written for MFP 100, portable information device 200, and other devices having display surfaces smaller than PCs 300, 300A. The web page of the second kind is a web page written for PCs 300, 300A and other devices having relatively large display surfaces.

User agents include a user agent of the first kind and a user agent of the second kind. A user agent of the first kind is any of a plurality of user agents determined by sets of the kind and the version of operating systems installed in MFP 100, portable information device 200, and other devices. A user agent of the second kind is any of a plurality of user agents determined by sets of the kind and the version of operating systems installed in PCs 300, 300A.

Server 400 sends back a web page of the first kind if a GET command including a user agent of the first kind is received. Server 400 sends back a web page of the second kind if a GET command including a user agent of the second kind is received. Although server 400 provides a web page of the first kind and a web page of the second kind having the same URL, it cannot use the redirect function if a user agent is not written in the HTTP header of the GET command. In this case, server 400 sends back one of a web page of the first kind and a web page of the second kind. In the example described below, server 400 sends back a web page of the second kind if a user agent is not written in the HTTP header of the GET command.

Server 400 may send back a web page using CSS (Cascading Style Sheets) Media Queries. In this case, server 400 sends back the web page specified by the URL included in the GET command to the device that has transmitted the GET command, without using the redirect function. The device, receiving the web page, generates a display image based on the web page using a style sheet corresponding to the size of the display screen of that device.

Figure 2:
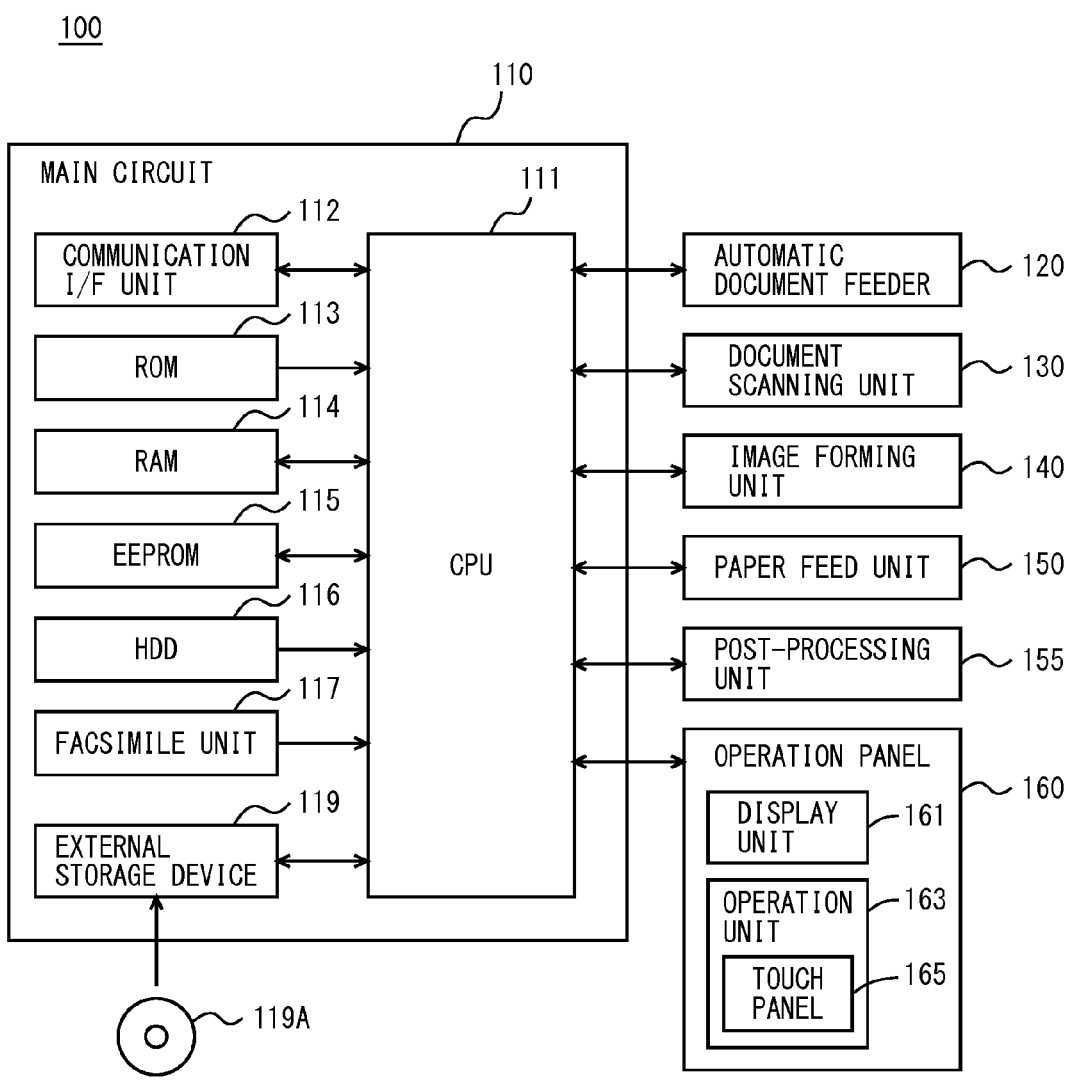
FIG. 2 is a block diagram showing an exemplary hardware configuration of an MFP.

FIG. 2 is a block diagram showing an exemplary hardware configuration of the MFP. Referring to FIG. 2, MFP 100 includes a main circuit 110, a document scanning unit 130 for scanning a document, an automatic document feeder 120 for conveying a document to document scanning unit 130, an image forming unit 140 for forming an image on paper or other media based on image data output by document scanning unit 130 scanning a document, a paper feed unit 150 for supplying paper to image forming unit 140, a post-processing unit 155, and an operation panel 160 serving as a user interface.

Main circuit 110 includes a CPU 111, a communication interface (I/F) unit 112, a ROM 113, a RAM 114, an EEPROM (Electrically Erasable and Programmable ROM) 115, a hard disk drive (HDD) 116 as a mass storage device, a facsimile unit 117, and an external storage device 119 to which a CD-ROM (Compact Disc-Read Only Memory) 119A is attached. CPU 111 is connected to automatic document feeder 120, document scanning unit 130, image forming unit 140, paper feed unit 150, post-processing unit 155, and operation panel 160 to control the entire MFP 100.

ROM 113 stores a program executed by CPU 111 or data necessary for executing the program. RAM 114 is used as a working area when CPU 111 executes a program. RAM 114 temporarily stores scan data (image data) successively sent from document scanning unit 130.

Operation panel 160 is provided on the top surface of MFP 100. Operation panel 160 includes a display unit 161 and an operation unit 163. Display unit 161 is a display device such as a liquid crystal display (LCD) and an organic ELD (Electro-Luminescence Display) and displays instruction menus to users and information about the acquired image data. Operation unit 163 includes a plurality of keys and accepts input of various instructions and data such as characters and numerals corresponding to keys. Operation unit 163 further includes a touch panel 165 for detecting the position specified by a user on the display surface of display unit 161. Touch panel 165 is provided on the top surface or the bottom surface of display unit 161 and outputs the coordinates of the position specified by the user to CPU 111. Touch panel 165 is a multi-touch screen panel. If the user specifies a plurality of positions simultaneously, touch panel 165 outputs the coordinates corresponding to each of a plurality of positions specified by the user to CPU 111. Touch panel 165 preferably has a size equal to or larger than the display surface of display unit 161. Touch panel 165 is superimposed on display unit 161, so that when the user touches the display surface of display unit 161, touch panel 165 outputs the coordinates corresponding to each of one or more positions specified by the user on the display surface of display unit 161 to CPU 111. Touch panel 165 may be of any type, for example, a resistive type, a surface acoustic wave type, an infrared type, an electromagnetic type, or a capacitive type.

Automatic document feeder 120 automatically conveys a plurality of sheets of a document set on a document tray one by one to a predetermined document scan position set on the platen glass of document scanning unit 130 and outputs the document having a document image read by document scanning unit 130 to a document output tray. Document scanning unit 130 includes a light source for emitting light to the document conveyed to the document scan position and a photoelectric transducer for receiving light reflected by the document to scan a document image based on the size of the document. The photoelectric transducer converts the received light into image data, which is an electrical signal, and outputs the signal to image forming unit 140. Paper feed unit 150 conveys paper accommodated in a paper feed tray to image forming unit 140.

Image forming unit 140 forms an image by a well-known electrophotographic technique. Image forming unit 140 forms an image on paper conveyed by paper feed unit 150, based on the processed image data obtained by performing various data processing such as shading correction on image data input from document scanning unit 130 or the externally received image data, and discharges paper having an image formed thereon to post-processing unit 155.

Post-processing unit 155 includes a plurality of bins for storing paper and performs post-processing on one or more sheets of paper conveyed from image forming unit 140. Post-processing includes a sorting process of successively conveying one or more sheets to a plurality of bins to sort the sheets into a plurality of sets, a punching process of punching holes on paper, and a stapling process of driving staples into paper. Post-processing may include any other processing that conveys or processes one or more sheets of paper.

Communication I/F unit 112 is an interface for connecting MFP 100 to network 3. CPU 111 communicates with PCs 300, 300A connected to network 3, with portable information device 200 connected via radio station 5, and with server 400 connected to the Internet 7, through communication I/F unit 112 to transmit/receive data.

Facsimile unit 117 is connected to the PSTN to transmit/receive facsimile data. Facsimile unit 117 converts image data read by document scanning unit 130 or data stored in HDD 116 into facsimile data and transmits the facsimile data to a facsimile machine connected to the PSTN. Facsimile unit 117 also stores the received facsimile data into HDD 116 or allows image forming unit 140 to form an image of facsimile data on paper.

External storage device 119 is loaded with CD-ROM 119A. CPU 111 can access CD-ROM 119A through external storage device 119. CPU 111 loads a program stored in CD-ROM 119A inserted in external storage device 119 into RAM 114 for execution. The program executed by CPU 111 may not be a program stored in CD-ROM 119A, but a program stored in HDD 116 may be loaded into RAM 114 for execution. In this case, another computer connected to network 3 may overwrite the program stored in HDD 116 of MFP 100 or additionally write a new program. Alternatively, MFP 100 may download a program from another computer connected to the network and store the program into HDD 116. The program referred to here includes not only a program directly executable by CPU 111 but also a source program, a compressed program, and an encrypted program.

Figure 3:
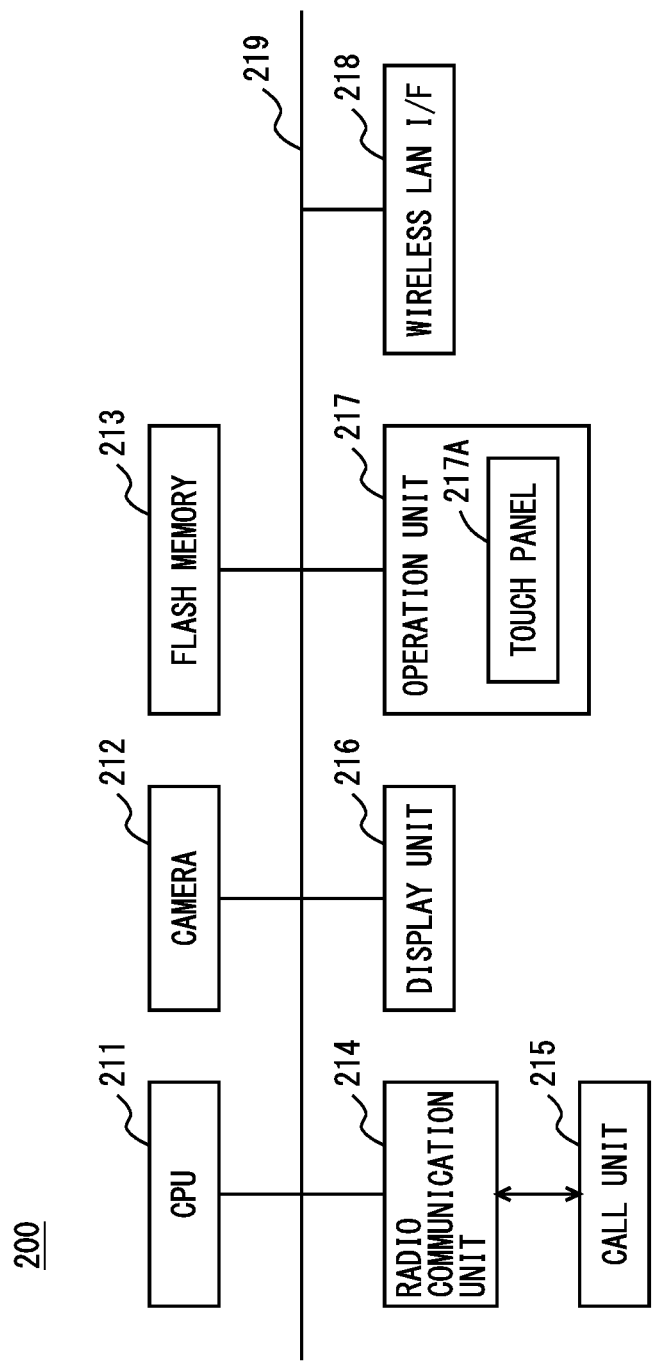
FIG. 3 is a block diagram showing an exemplary hardware configuration of a portable information device.

FIG. 3 is a block diagram showing an exemplary hardware configuration of the portable information device. Referring to FIG. 3, portable information device 200 includes a CPU 211 for controlling the entire portable information device 200, a camera 212, a flash memory 213 for storing data in a nonvolatile manner, a call unit 215, a radio communication unit 214 connected to call unit 215, a display unit 216 for displaying information, an operation unit 217 for accepting input of the user's operation, and a wireless LAN interface (I/F) 218.

Radio communication unit 214 communicates by radio with a mobile phone base station connected to a telephone communication network. Radio communication unit 214 connects portable information device 200 to a telephone communication network to enable a call using call unit 215. Radio communication unit 214 decodes a voice signal obtained by demodulating a radio signal received from a mobile phone base station and outputs the decoded signal to call unit 215. Radio communication unit 214 encodes voice input from call unit 215 and transmits the encoded signal to a mobile phone base station. Call unit 215 includes a microphone and a speaker. Call unit 215 outputs voice input from radio communication unit 214 from the speaker and outputs voice input from the microphone to radio communication unit 214. Radio communication unit 214 is controlled by CPU 211 to transmit/receive data through a mobile phone base station and connects portable information device 200, for example, to the Internet.

Camera 212 includes a lens and a photoelectric transducer such as a CMOS (Complementary Metal Oxide Semiconductor) sensor. Light collected by the lens is imaged on the CMOS sensor, and the CMOS sensor converts the received light into image data for output to CPU 211.

Display unit 216 is a display device such as a liquid crystal display (LCD) and an organic ELD and displays instruction menus to the user and externally received data. Operation unit 217 includes a plurality of keys to accept input of various instructions and data such as characters and numerals through the user's operation corresponding to keys.

Operation unit 217 includes a touch panel 217A. Touch panel 217A detects the position specified by the user on the display surface of display unit 216. Touch panel 217A is provided on the top surface or the bottom surface of display unit 216 and outputs the coordinates of the position specified by the user to CPU 211. Touch panel 217A is a multi-touch screen panel. If the user specifies a plurality of positions simultaneously, touch panel 217A outputs the coordinates corresponding to each of a plurality of positions specified by the user to CPU 211. Touch panel 217A preferably has a size equal to or larger than the display surface of display unit 216. Touch panel 217A is superimposed on display unit 216, so that when the user touches the display surface of display unit 216, touch panel 217A outputs the coordinates corresponding to each of one or more positions specified by the user on the display surface of display unit 216 to CPU 211. Touch panel 217A may be of any type, for example, a resistive type, a surface acoustic wave type, an infrared type, an electromagnetic type, or a capacitive type.

Wireless LAN I/F 218 is an interface that communicates with radio station 5 for connecting portable information device 200 to network 3. Portable information device 200 can communicate with MFP 100, PCs 300, 300A, and server 400 through wireless LAN I/F 218 to transmit/receive data.

Figure 4:
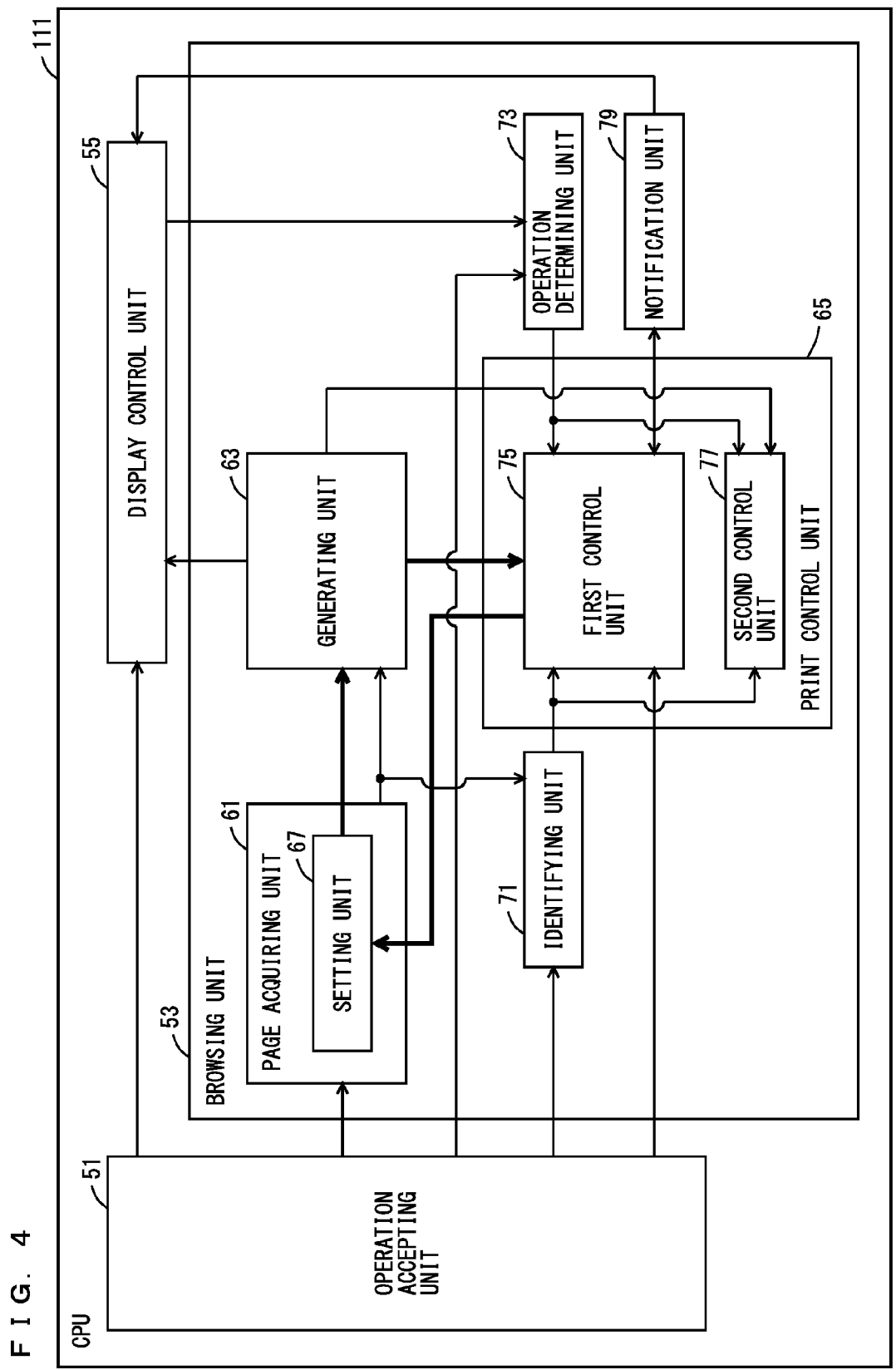
FIG. 4 is a diagram showing exemplary functions of the CPU of the MFP.

FIG. 4 is a diagram illustrating exemplary functions of the CPU of the MFP. The functions shown in FIG. 4 are the functions formed in CPU 111 by CPU 111 of MFP 100 executing a browsing program stored in ROM 113, EEPROM 115, HDD 116, or CD-ROM 119A. Referring to FIG. 4, CPU 111 includes an operation accepting unit 51 for accepting the operation input by the user, a browsing unit 53, and a display control unit 55 for controlling display unit 161.

Operation accepting unit 51 accepts the operation input by the user to operation unit 163. The operation accepted by operation accepting unit 51 includes a page-transmission requesting operation. Page transmission requesting operation is an operation of requesting transmission of a web page stored in server 400 connected to the Internet 7. For example, when it is detected that a key in operation unit 163 assigned for a URL is specified by the user, operation accepting unit 51 accepts a page-transmission requesting operation for requesting transmission of a web page specified by the URL assigned to the key. When the URL input by the user to operation unit 163 is detected, a page-transmission requesting operation is accepted for requesting transmission of a web page specified by the detected URL. In a case where the web page appearing on display unit 161 includes a button linked to another web page, if touch panel 165 of operation unit 163 detects that the button is specified, a page-transmission requesting operation is accepted for requesting transmission of the web page linked to the specified button. When accepting a page-transmission requesting operation, operation accepting unit 51 outputs a page acquisition instruction to browsing unit 53. The page acquisition instruction includes the URL assigned to the web page.

When a page acquisition instruction is input from operation accepting unit 51, browsing unit 53 transmits a page-transmission request command to request the web server connected to the Internet 7 to transmit a web page, then receives the web page sent from server 400, and outputs the web page to display control unit 55. Here the page acquisition instruction input from operation accepting unit 51 includes the URL assigned to the web page stored in server 400, by way of example. In this case, browsing unit 53 transmits a page-transmission request command to server 400 and receives a web page from server 400.

Browsing unit 53 includes a page acquiring unit 61, a generating unit 63, a print control unit 65, an identifying unit 71, an operation determining unit 73, and a notification unit 79. Page acquiring unit 61 receives a page acquisition instruction from operation accepting unit 51. In response to input of a page acquisition instruction from operation accepting unit 51, page acquiring unit 61 generates a page-transmission request command that includes the URL included in the page acquisition instruction for requesting transmission of a web page. The page-transmission request command is, for example, a GET command in the HTTP (HyperText Transfer Protocol) protocol. When generating a page-transmission request command, page acquiring unit 61 transmits the generated page-transmission request command to server 400 specified by the URL included in the page-transmission requesting operation, through communication I/F unit 112. If communication I/F unit 112 receives a web page from server 400 after the page-transmission request command is transmitted to server 400, page acquiring unit 61 acquires the received web page and outputs the acquired web page to generating unit 63 and identifying unit 71.

The web page received by page acquiring unit 61 is either a web page of the first kind or a web page of the second kind. Page acquiring unit 61 either describes or does not describe a predetermined user agent in the HTTP header of the GET command. If a user agent is not described, one of a web page of the first kind and a web page of the second kind is received. While surfing web sites, the user may receive another web page linked to a web page. In this case, either a web page of the first kind or a web page of the second kind is received. When the user wishes a web page for mobile terminals, a GET command including the user agent of the first kind may be transmitted, so that a web page of the first kind is received. When the user wishes a web page for PCs, a GET command including the user agent of the second kind may be transmitted, so that a web page of the second kind is received.

Generating unit 63 generates a display image by interpreting the web page input from page acquiring unit 61 and outputs the generated display image to display control unit 55 and print control unit 65. Display control unit 55 controls display unit 161 so that the display image input from browsing unit 53 appears on display unit 161. If the web page includes a description of CSS Media Queries, generating unit 63 interprets the web page to generate a display image. Specifically, generating unit 63 generates a display image using a style sheet corresponding to the size of the display screen of MFP 100 among style sheets defined by the CSS Media Queries written in the web page.

Print control unit 65 receives a display image from generating unit 63. The operation accepted by operation accepting unit 51 includes a print operation. For example, a print operation is accepted if it is detected that the user specifies a key in operation unit 163 assigned for the operation of giving an instruction for printing. The print operation is an operation of giving an instruction to print a display image appearing on display unit 161. When accepting a print operation, operation accepting unit 51 outputs a print instruction to print control unit 65 and identifying unit 71. When a print instruction is input from operation accepting unit 51, print control unit 65 generates print data based on the display image appearing on display unit 161 and outputs the generated print data to image forming unit 140. Image forming unit 140 forms the display image on paper, based on the print data input from generating unit 63.

Identifying unit 71 specifies the web page corresponding to the display image appearing on display unit 161 at the point of time when operation accepting unit 51 accepts a print operation. Specifically, in response to input of a print instruction from operation accepting unit 51, identifying unit 71 specifies the web page input most recently before the print instruction is input, among the web pages input from page acquiring unit 61. Here, among the web pages acquired by page acquiring unit 61, the web page input most recently before the print instruction is input is referred to as the currently displayed web page. The display image appearing on display unit 161 at the point of time when operation accepting unit 51 accepts a print operation, in other words, the display image generated based on the currently displayed web page is referred to as the first display image.

Identifying unit 71 identifies whether the kind of the first display image is the first kind, based on the specified, currently displayed web page. The kinds of display images include the first kind and the second kind. The first kind is a display image displayed on an information processing apparatus such as MFP 100 or portable information device 200 that has a display with a display screen size equal to or smaller than a predetermined first size. The second kind is a display image displayed on a device such as PCs 300, 300A that has a display with a display screen size larger than the predetermined first size. If the kind of the first display image is identified as the first kind, identifying unit 71 outputs the identification result to first control unit 75 and second control unit 77 to indicate that the first display image is of the first kind. If the kind of the first display image is not identified as the first kind, identifying unit 71 outputs the identification result to first control unit 75 and second control unit 77 to indicate that the first display image fails to be identified as the first kind.

If the specified, currently displayed web page includes a description of a predetermined command, identifying unit 71 determines that the first display image is of the first kind. The description of a predetermined command is, for example, a description of "viewport" set in the meta tag, or a description indicating that the size of the display surface of the device in the media attribute is equal to or smaller than the first size in CSS Media Queries. The web page including "viewport" set in the meta tag is often generated on the premise that it is displayed on a mobile device having a display surface switchable between the portrait direction and the landscape direction. The web page including a description indicating that the size of the display surface of the device in the media attribute is smaller than the first size is often generated on the premise that it is displayed on a device having a display surface size equal to or smaller than the first size. The first display image generated by generating unit 63 based on the currently displayed web page is generated based on the size of display unit 161.

The operation accepted by operation accepting unit 51 includes an operation of giving an instruction to enlarge or reduce the first display image appearing on display unit 161. The operation of giving an instruction to enlarge or reduce the first display image appearing on display unit 161 includes a zoom-in operation and a zoom-out operation. The zoom-in operation is an operation of giving an instruction to display the enlarged first display image. Operation accepting unit 51 accepts a zoom-in operation when it is detected that a key in operation unit 163 assigned for a zoom-in operation is specified. The zoom-in operation includes a pinch-out operation. The pinch-out operation is detected from the user's gesture of spreading two fingers apart while touching touch panel 165 with the two fingers. Operation accepting unit 51 accepts a pinch-out operation if touch panel 165 detects the two positions specified by the user and detects that the distance between the two positions becomes wide with time. If a zoom-in operation is accepted, operation accepting unit 51 outputs an enlarged display instruction to operation determining unit 73 and display control unit 55. If an enlarged display instruction is input from operation accepting unit 51, display control unit 55 enlarges a part of the first display image appearing on display unit 161 and displays the enlarged image on display unit 161.

The zoom-out operation is an operation to give an instruction to display a first display image in a reduced size. Operation accepting unit 51 accepts a zoom-out operation when it is detected that the key in operation unit 163 assigned for a zoom-out operation is specified. The zoom-out operation includes a pinch-in operation. The pinch-in operation is detected from the user's gesture of putting two fingers together while touching touch panel 165 with the two fingers. Operation accepting unit 51 accepts a pinch-in operation if touch panel 165 detects two positions specified by the user's two fingers and detects that the distance between the two positions decreases with time. When accepting a zoom-out operation, operation accepting unit 51 outputs a reduced display instruction to the operation determining unit and display control unit 55. If a reduced display instruction is input from operation accepting unit 51, display control unit 55 reduces a part of the first display image appearing on display unit 161 and displays the reduced image on display unit 161.

Operation determining unit 73 receives the first display image displayed on display unit 161 by display control unit 55. Operation determining unit 73 determines whether operation accepting unit 51 accepts an operation of giving an instruction to enlarge or reduce the first display image while the first display image appears on display unit 161. If an enlarged display instruction or a reduced display instruction is input from operation accepting unit 51 while the first display image appears on display unit 161, operation determining unit 73 determines that operation accepting unit 51 accepts an operation of giving an instruction to enlarge or reduce the first display image. If neither an enlarged display instruction nor a reduced display instruction is input from operation accepting unit 51 while the first display image appears on display unit 161, operation determining unit 73 determines that operation accepting unit 51 has not accepted an operation of giving an instruction to enlarge or reduce the first display image. Operation determining unit 73 outputs an operation accepting signal to first control unit 75 and second control unit 77 in response to an enlarged display instruction or a reduced display instruction being input from operation accepting unit 51 while the first display image appears on display unit 161. Alternatively, operation determining unit 73 may output an operation accepting signal to first control unit 75 and second control unit 77 in response to an enlarged display instruction being input from operation accepting unit 51 while the first display image appears on display unit 161, and operation determining unit 73 may not output an operation accepting signal to first control unit 75 and second control unit 77 if a reduced display instruction is input from operation accepting unit 51 while the first display image appears on display unit 161.

Print control unit 65 includes a first control unit 75 and a second control unit 77. First control unit 75 receives an identification result from identifying unit 71. If the identification result input from identifying unit 71 indicates that the first display image is of the first kind, first control unit 75 outputs a reconstruction instruction to page acquiring unit 61. If the identification result input from identifying unit 71 indicates that the first display image fails to be identified as the first kind and an operation accepting signal is not input from operation determining unit 73, first control unit 75 outputs a reconstruction instruction to page acquiring unit 61. If the identification result input from identifying unit 71 indicates that the first display image fails to be identified as the first kind and an operation accepting signal is input from operation determining unit 73, first control unit 75 outputs nothing to page acquiring unit 61.

Page acquiring unit 61 includes a setting unit 67. If a reconstruction instruction is input from first control unit 75, setting unit 67 determines whether the currently displayed web page includes a description of CSS Media Queries. If the currently displayed web page does not include a description of CSS Media Queries, setting unit 67 sets a user agent of the second kind in the header of the page-transmission request command for requesting transmission of a web page and transmits the page-transmission request command to server 400 specified by the URL included in the page acquisition instruction through communication I/F unit 112. The user agent of the second kind is any of a plurality of user agents determined by sets of the kind and the version of operating systems installed in PCs 300, 300A. The user agent of the second kind may be stored in HDD 116 in advance. When communication I/F unit 112 receives a web page from server 400 after the page-transmission request command is transmitted to server 400, setting unit 67 acquires the received web page and outputs the acquired web page to generating unit 63. The web page acquired by setting unit 67 is referred to as a re-acquired web page.

If the re-acquired web page is input from setting unit 67, generating unit 63 interprets the re-acquired web page to generate a second display image and outputs the generated second display image to print control unit 65. The second display image may be output to display control unit 55 to allow display control unit 55 to display the second display image on display unit 161.

If the currently displayed web page includes a description of CSS Media Queries, setting unit 67 outputs a generation instruction to generating unit 63. If a generation instruction is input from setting unit 67, generating unit 63 interprets the currently displayed web page to generate a third display image. Specifically, generating unit 63 generates a third display image using a style sheet corresponding to a device such as a PC having a display screen of relatively large size, among style sheets defined by the CSS Media Queries written in the currently displayed web page. Generation unit 63 outputs the generated third display image to print control unit 65. If a style sheet for printers is defined by the CSS Media Queries written in the currently displayed web page, a third display image is generated using that style sheet. The third display image may be output to display control unit 55 to allow display control unit 55 to display the third display image on display unit 161.

First control unit 75 outputs a notification instruction to notification unit 79 before outputting a reconstruction instruction to setting unit 67, if the identification result input from identifying unit 71 indicates that the first display image is of the first kind or if the identification result input from identifying unit 71 indicates that the first display image fails to be identified as the first kind and an operation accepting signal is not input from operation determining unit 73.

In response to input of a notification instruction, notification unit 79 outputs a message display instruction to display control unit 55. The message display instruction includes a message to notify the user that the second display image or the third display image different from the first display image is to be printed. In response to input of a message display instruction, display control unit 55 displays a notification screen on display unit 161. The notification screen includes a message included in the message display instruction, an OK button for accepting an operation by the user to permit, and an NG button for accepting an operation not to permit. If touch panel 165 detects that the user specifies the OK button in the notification screen, operation accepting unit 51 accepts an operation to permit by the user.

If touch panel 165 detects that the user specifies the NG button in the notification screen, operation accepting unit 51 accepts an operation not to permit by the user. If an operation to permit is accepted, operation accepting unit 51 outputs a permission signal to first control unit 75. If an operation not to permit is accepted, operation accepting unit 51 outputs a non-permission signal to first control unit 75.

First control unit 75 outputs a reconstruction instruction to setting unit 67 on condition that a permission signal is input from operation accepting unit 51 after the notification instruction is output to notification unit 79. First control unit 75 does not output a reconstruction instruction to setting unit 67 if a non-permission signal is input from operation accepting unit 51 after the notification instruction is output to notification unit 79.

In response to input of the second display image or the third display image from generating unit 63, first control unit 75 generates print data based on the second display image or the third display image and controls image forming unit 140 to form an image of the generated print data on paper. The display image for PCs is thus formed on paper.

Second control unit 77 receives the identification result from identifying unit 71. If the identification result input from identifying unit 71 indicates that the first display image fails to be identified as the first kind, and an operation accepting signal is input from operation determining unit 73, second control unit 77 generates print data based on the first display image input from generating unit 63 and controls image forming unit 140 to form an image of the generated print data on paper. If the identification result input from identifying unit 71 indicates that the first display image is of the first kind, or if the identification result input from identifying unit 71 indicates that the first display image fails to be identified as the first kind and an operation accepting signal is not input from operation determining unit 73, second control unit 77 does nothing.

Figure 5:
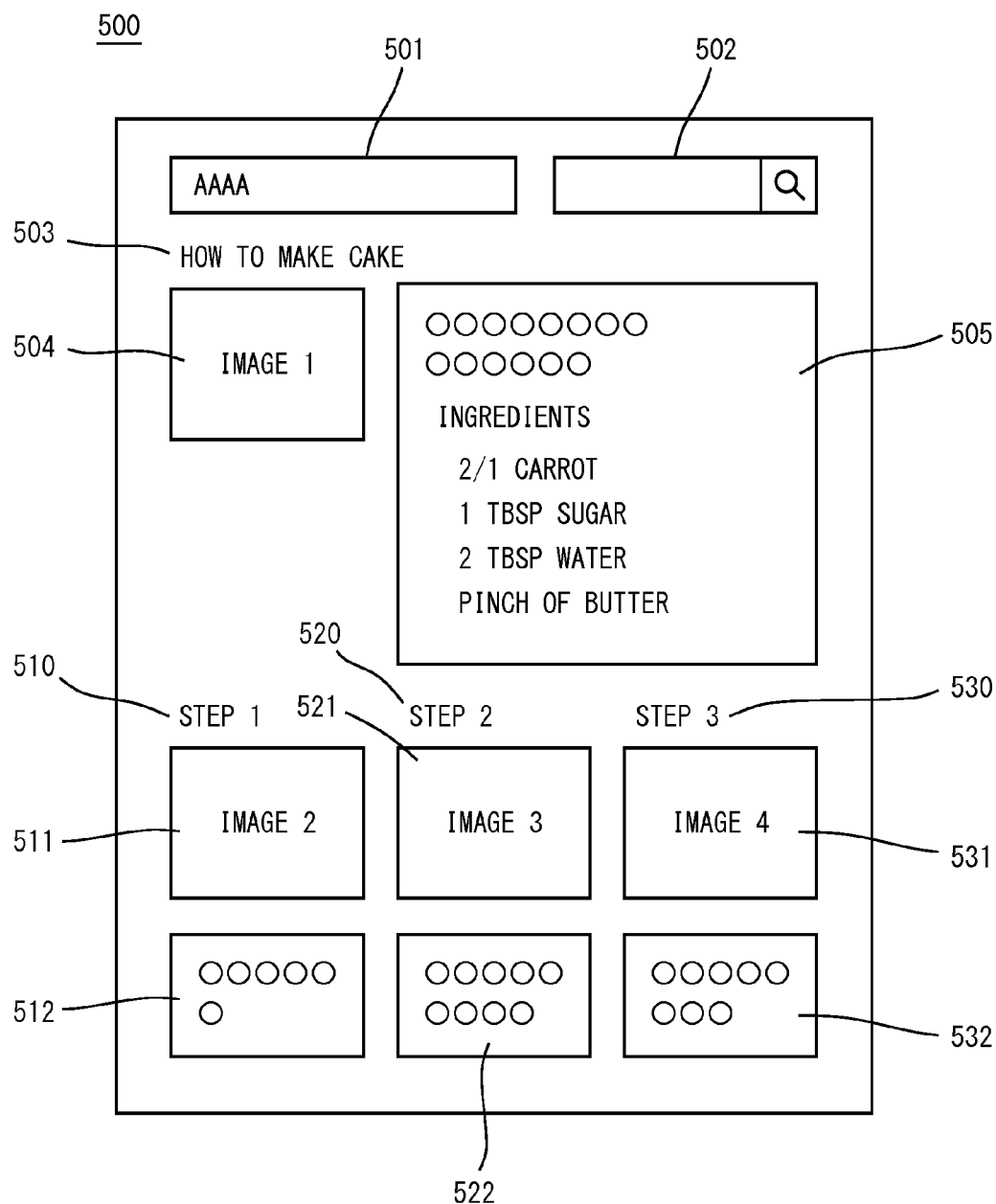
FIG. 5 is a diagram showing an example of a display image of the second kind.

FIG. 5 is a diagram showing an example of a display image of the second kind. Referring to FIG. 5, a display image 500 of the second kind includes contents 501 to 505, 510 to 512, 520 to 522, 530 to 532.

FIG. 6 to FIG. 9 are diagrams showing examples of a display image of the first kind. The display image of the first kind shown here corresponds to the display image of the second kind shown in FIG. 5. The display image of the first kind consists of first to fourth pages shown in FIG. 6 to FIG. 9, respectively.

Figure 6:
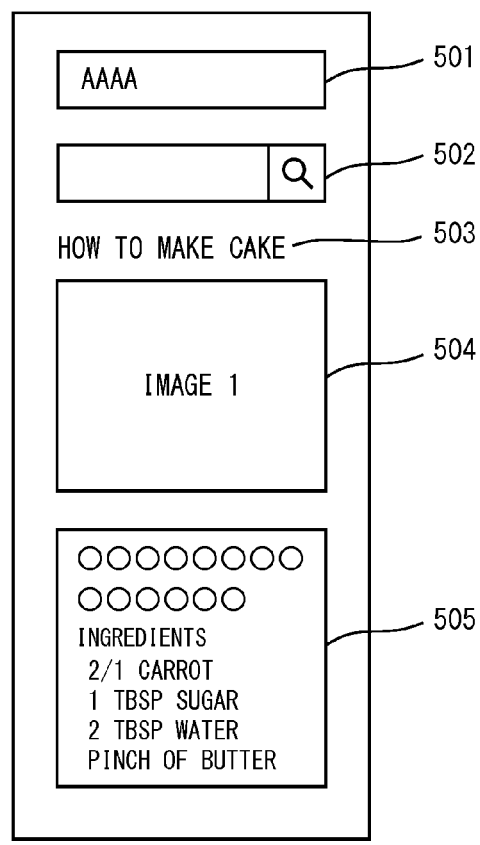
FIG. 6 is a first diagram showing an example of a display image of the first kind.

Referring to FIG. 6, the first page 610 in the display image of the first kind is an image in which contents 501 to 505 included in display image 500 of the second kind are arranged in the vertical direction.

Figure 7:
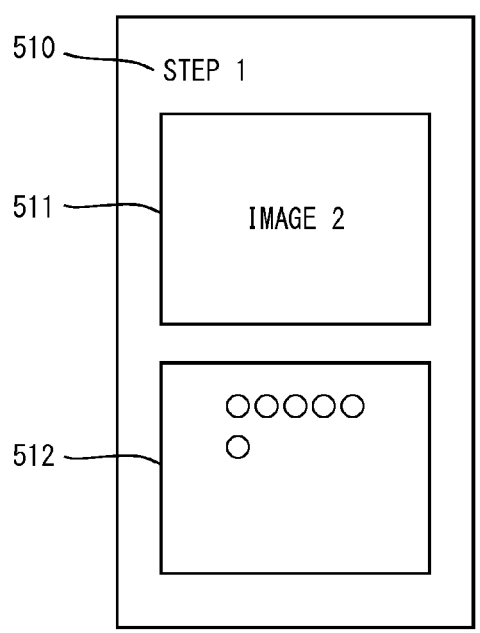
FIG. 7 is a second diagram showing an example of the display image of the first kind.

Referring to FIG. 7, the second page 620 in the display image of the first kind is an image in which contents 510 to 512 included in display image 500 of the second kind are arranged in the vertical direction.

Figure 8:
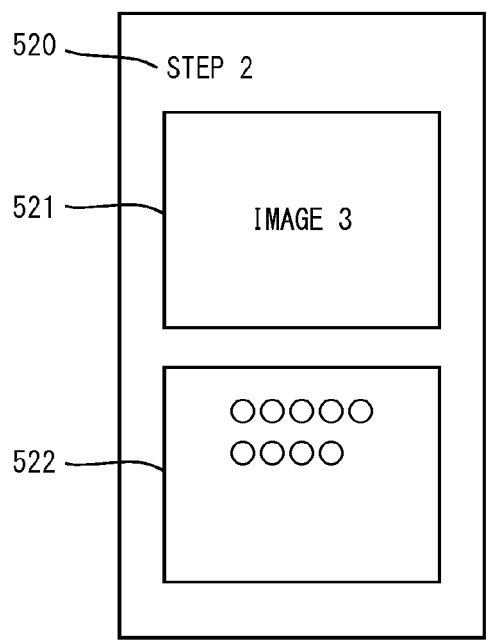
FIG. 8 is a third diagram showing an example of the display image of the first kind.

Referring to FIG. 8, the third page 630 in the display image of the first kind is an image in which contents 520 to 522 included in display image 500 of the second kind are arranged in the vertical direction.

Figure 9:
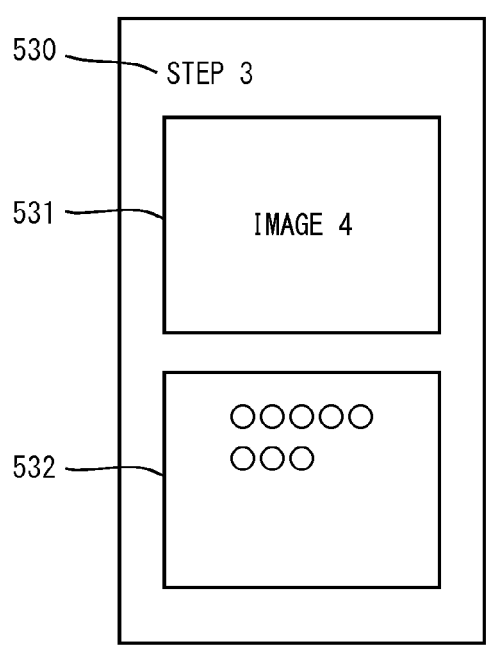
FIG. 9 is a fourth diagram showing an example of the display image of the first kind.

Referring to FIG. 9, the fourth page 640 in the display image of the first kind is an image in which contents 530 to 532 included in display image 500 of the second kind are arranged in the vertical direction.

For example, if the user operates MFP 100 to perform a print operation in a state in which any of the first to fourth pages 610, 620, 630, 640 in the display image of the first kind appears as a first display image on display unit 161, display image 500 of the second kind is generated as a second display image and formed on paper. For example, when the first page 610 in the display image of the first kind appears as a first display image on display unit 161, and if the first display image is identified as the first kind, display image 500 of the second kind is generated as a second display image and printed. When the first page 610 in the display image of the first kind appears as a first display image on display unit 161, and if the first display image is not identified as the first kind, in other words, if the first display image is identified as the second kind, or if the first display image is identified as neither the first kind nor the second kind and neither a zoom-in operation nor a zoom-out operation is accepted, display image 500 of the second kind is generated as a second display image and printed. The user rarely performs a zoom-in operation or a zoom-out operation in a state in which any of the first to fourth pages 610, 620, 630, 640 in the display image of the first kind appears on display unit 161.

The user sometimes operates MFP 100 to input a zoom-in operation or a zoom-out operation in a state in which display image 500 of the second kind appears as a first display image on display unit 161. In this case, if the user performs a zoom-in operation or a zoom-out operation and thereafter performs a print operation, display image 500 of the second kind, which is the first display image appearing on display unit 161, is formed on paper. For example, when display image 500 of the second kind appears as a first display image on display unit 161, the first display image is not identified as the first kind. In other words, when display image 500 of the second kind appears as a first display image on display unit 161, either the first display image is identified as the second kind or the first display image is identified as neither the first kind nor the second kind. In this case, if a zoom-in operation or a zoom-out operation is accepted, display image 500 of the second kind appearing as a first display image on display unit 161 is printed.

Figure 10:
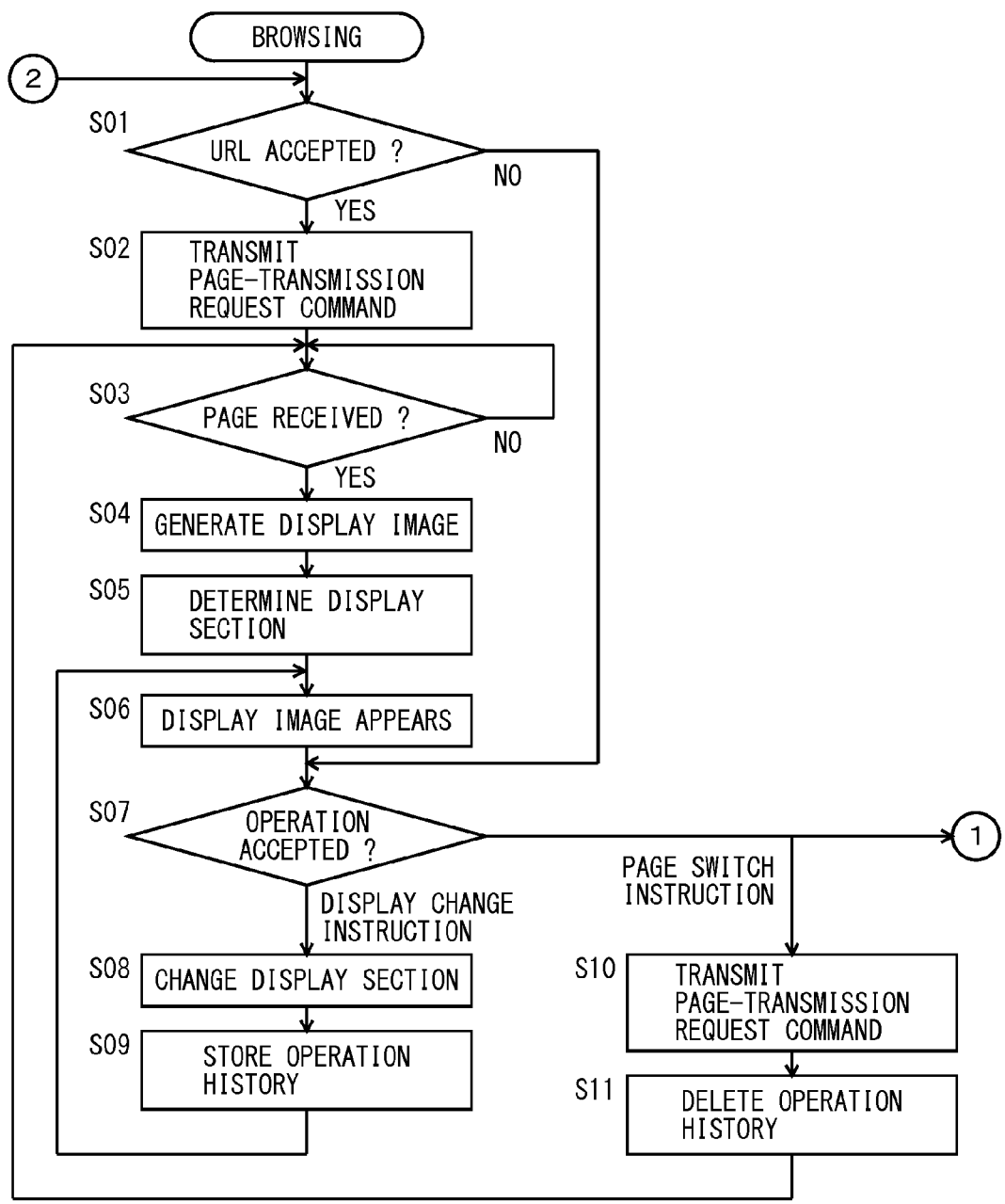
FIG. 10 is a first flowchart showing an example of the procedure of a browsing process.
Figure 11:
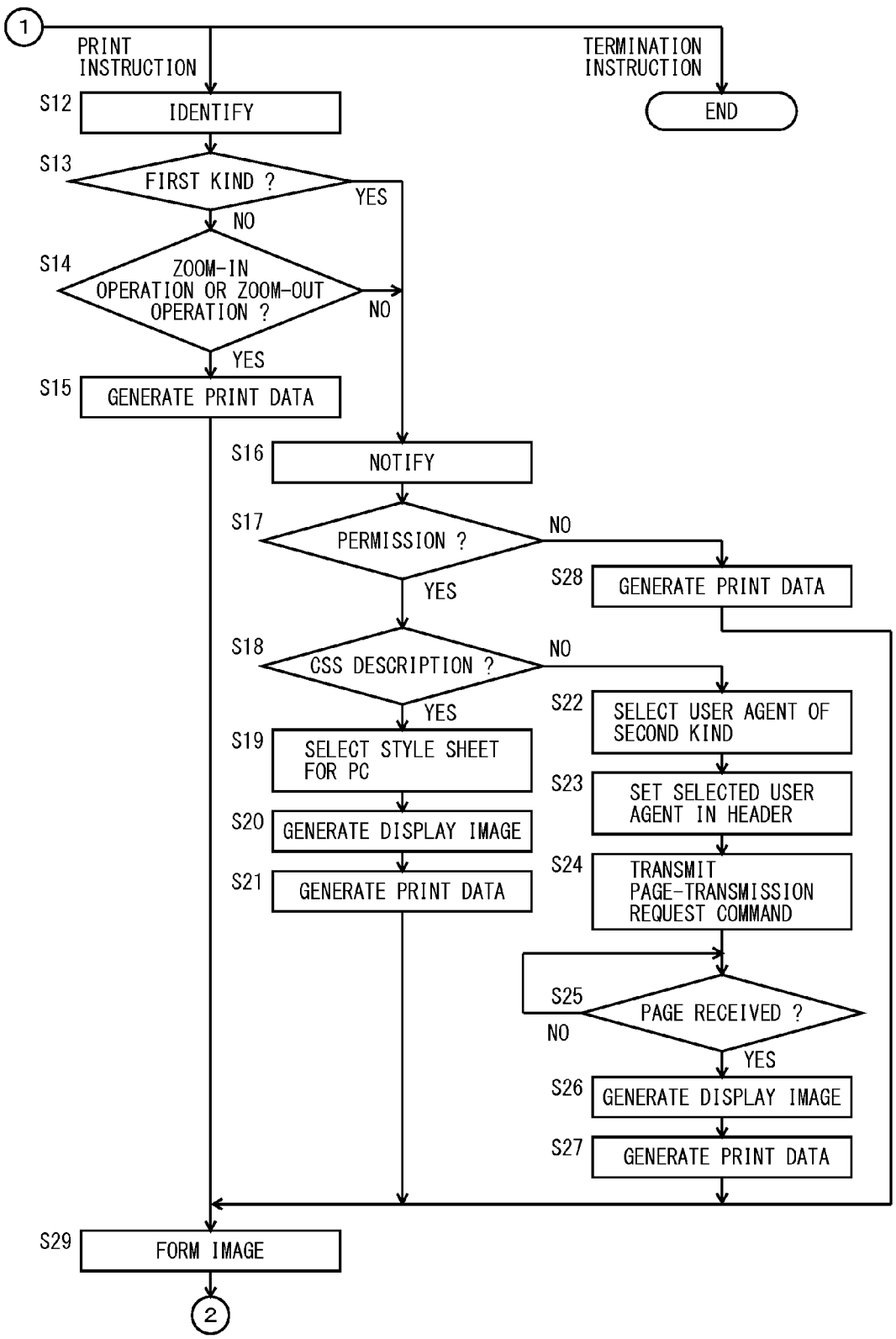
FIG. 11 is a second flowchart showing an example of the procedure of the browsing process.

FIG. 10 and FIG. 11 are flowcharts showing an example of the procedure of a browsing process. The browsing process is a process executed by CPU 111 by CPU 111 of MFP 100 executing a browsing program stored in ROM 113, EEPROM 115, HDD 116, or CD-ROM 119A. Referring to FIG. 10 and FIG. 11, CPU 111 accepts a URL (step S01). If a URL input to operation unit 163 by the user is detected, the detected URL is accepted. If a predetermined URL is set, the predetermined URL may be decided at the point of time when the browsing program is started, without accepting input of a URL by the user.

In step S02, a page-transmission request command including the URL accepted in step S01 is transmitted. The page-transmission request command is, for example, a GET command. The GET command is transmitted to a computer specified by the URL, here, server 400 through communication I/F unit 112.

In the next step S03, it is determined whether a web page is received. It is determined whether communication I/F unit 112 receives a web page from the computer receiving the page-transmission request command transmitted in step S02, here, server 400. The process waits until a web page is received from server 400. If a web page is received, the process proceeds to step S04.

In step S04, the web page received in step S03 is interpreted, and a display image is generated. In the next step S05, a display section is determined. A part of the display image that is to be displayed on display unit 161 is determined as a display section. The entire display image is determined as a display section by default. The display section in the display image then appears on display unit 161 (step S06). The process then proceeds to step S07.

In step S07, it is determined whether an operation by the user is accepted. The operation input by the user to operation unit 163 is accepted. The operation by the user includes a display change instruction operation for giving an instruction to change the display section, a page switch instruction operation for switching the display image to a display image of another web page, a print instruction operation for printing the display image, and a termination instruction operation to terminate the process. The display change instruction operation includes a zoom-in operation or a zoom-out operation for giving an instruction to enlarge or reduce the image appearing on display unit 161 and a scroll operation for giving an instruction to move the display section in the display image.

In the next step S08, the process branches depending on the accepted operation. If a display change instruction operation is accepted, the process proceeds to step S08. If a page switch instruction operation is accepted, the process proceeds to step S10. If a print instruction operation is accepted, the process proceeds to step S12. If a termination instruction operation is accepted, the process ends.

In step S08, the display section is changed, and the process then proceeds to step S09. If a zoom-in operation is accepted, the display section in the display image is zoomed in and displayed on the entire display unit 161. If a zoom-out operation is accepted, the display section in the display image is zoomed out and displayed on the entire display unit 161. If a scroll operation is accepted, the display section is moved parallel, and the moved display section in the display image appears on the entire display unit 161. In step S09, the operation history is stored in HDD 116, and the process then returns to step S06.

In step S10, a page-transmission request command including the URL of the switched web page is transmitted. This is the case when the web page received in step S03 includes a description of linkage to another web page or when the display image appearing on step S06 includes a button associated with the URL of another page. If the user's operation of specifying the button is accepted, a page-transmission request command including the URL associated with the specified button is transmitted. The process then proceeds to step S11. In step S11, the operation history stored in step S09 is deleted, and the process then returns to step S03.

In step S12, an identifying process is executed. It is identified whether the kind of the display image appearing on display unit 161 in step S06 is the first kind, based on the web page received in step S03. Specifically, if the web page received in step S03 includes a description of a predetermined command, it is determined that the display image is of the first kind. The description of a predetermined command includes, for example, a description of "viewport" specified in the meta tag or a description indicating that the size of the display surface of the device in the media attribute is equal to or smaller than the first size in CSS Media Queries.

The process branches based on the identification result (step S13). If the kind of the display image appearing on display unit 161 in step S06 is not the first kind, the process proceeds to step S14. If it is the first kind, the process proceeds to step S16. The kind of the display image appearing on display unit 161 in step S06 fails to be identified as the first kind, when the kind of the display image is identified as the second kind, based on the web page received in step S03, or when the kind of the display image is identified as neither the first kind nor the second kind, based on the web page received in step S03.

In step S14, it is determined whether the operations accepted in step S07 include a zoom-in operation or a zoom-out operation. If the operation history stored in step S09 includes a zoom-in operation or a zoom-out operation, the process proceeds to step S15. If not, the process proceeds to step S16. In step S15, print data is generated based on the display image generated in step S04, and the process then proceeds to step S29.

In step S16, a message is given to the user. Specifically, a notification screen appears on display unit 161. The notification screen includes a message that an image different from the display image appearing on display unit 161 is to be printed, an OK button for accepting an operation to permit by the user, and an NG button for accepting an operation not to permit.

In step S17, it is determined whether permission by the user is accepted. If the operation by the user of specifying the OK button in the notification screen is accepted, permission is accepted. If permission by the user is accepted, the process proceeds to step S18. If not, the process proceeds to step S28. In step S28, print data is generated based on the display image generated in step S04, and the process then proceeds to step S29.

In step S18, it is determined whether the web page received in step S03 includes a description of CSS Media Queries. If the web page includes a description of CSS Media Queries, the process proceeds to step S19. If not, the process proceeds to step S22. In step S19, a style sheet corresponding to a device such as a PC having the display surface of a relatively large size is selected from among style sheets defined by CSS Media Queries described in the web page received in step S03. A display image is then generated using the selected style sheet (step S20). Print data is then generated based on the generated display image (step S21). The process then proceeds to step S29.

In step S22, the user agent of the second kind is selected. For example, one of a plurality of user agents determined by sets of the kind and the version of operating systems installed in PCs 300, 300A is selected as the user agent of the second kind. For example, the user agent of the second kind may be stored in HDD 116 in advance.

The selected user agent is then set in the header of the page-transmission request command (step S23), and the process proceeds to step S24. In step S24, the page-transmission request command is transmitted to the computer specified by the URL included in the page-transmission requesting operation, here, server 400, through communication I/F unit 112. The process waits until communication I/F unit 112 receives a web page from server 400 (NO in step S25). If a web page is received (YES in step S25), the process proceeds to step S26. In step S26, the web page received in step S25 is interpreted, and a display image is generated. In the next step S27, print data is generated based on the generated display image, and the process proceeds to step S29.

In step S29, the display image is formed on paper based on the print data, and the process returns to step S01. If the process proceeds from step S15, the display image is formed on paper based on the print data generated in step S15. If the process proceeds from step S21, the display image is formed on paper based on the print data generated in step S21. If the process proceeds from step S27, the display image is formed on paper based on the print data generated in step S27. If the process proceeds from step S28, the display image is formed on paper based on the print data generated in step S28.

As described above, MFP 100 in the present embodiment functions as an information processing apparatus. If the first display image is identified as the first kind, or if the first display image fails to be identified as the first kind and it is determined that a zoom-in operation or a zoom-out operation is accepted, MFP 100 generates print data for printing a second display image that corresponds to the first display image and is of the second kind different from the first kind. When the first display image fails to be identified as the first kind, either the first display image is of the first kind or the first display image is of the second kind. If the first display image is of the second kind, it is likely that characters in the first display image are so small that the user performs a zoom-in operation or a zoom-out operation. The first display image, therefore, is likely to be of the second kind when a zoom-in operation or a zoom-out operation is accepted. The first display image is likely to be of the first kind when a zoom-in operation or a zoom-out operation is not accepted. Thus, when the first display image fails to be identified as the first kind and if a zoom-in operation or a zoom-out operation by the user is not accepted, print data for printing a second display image of the second kind is generated, assuming that the first display image is of the first kind. When the first display image is not identified as the first kind and it is determined that a zoom-in operation or a zoom-out operation is accepted, print data for printing the first display image is generated, assuming that the first display image is of the second kind. A display image suitable for printing and a display image suitable for printing are thus switchable.

If the web page corresponding to the first display image includes a description for generating a second display image of the second kind, for example, if CSS Media Queries include a description indicating that the display surface size of the device in the media attribute is larger than the first size, MFP 100 generates a second display image based on the web page corresponding to the first display image and thereby can generate a display image suitable for printing. If the web page corresponding to the first display image does not include a description for generating a second display image of the second kind, MFP 100 transmits a GET command including the user agent of the second kind in the HTTP header to acquire a web page for generating a display image of the second kind. MFP 100 thus can acquire a web page suitable for printing.

MFP 100 easily identifies the first display image as the first kind if the web page corresponding to the first display image includes a description of a predetermined command, for example, if the web page includes a description of "viewport" specified in the meta tag or a description indicating that the display surface size of the device in the media attribute is equal to or smaller than the first size in CSS Media Queries. Accordingly, it can be readily determined from the web page whether the web page is suitable for printing.

MFP 100 notifies the user that a second display image different from the first display image will be printed, so that the user can be notified in advance that the image to be printed is different from the displayed image. MFP 100 generates print data for printing the second image on condition that permission by the user is accepted. This processing can prevent printing of an image not intended by the user.

Although MFP 100 has been described as an example of the information processing apparatus in the foregoing embodiment, portable information device 200 may be loaded with a browsing program similar as in MFP 100 to serve the similar functions as in MFP 100. It is needless to say that the present invention can be understood as a printing method that allows MFP 100 or portable information device 200 to execute the browsing process shown in FIG. 10 and FIG. 11, and a browsing program that allows CPU 111 of MFP 100 or CPU 211 of portable information device 200 to execute the printing method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus comprising:
an operation accepting unit to accept an operation by a user;
a display unit to display an image; and
a controller,
the controller comprising:
a page acquiring unit configured to request a server to transmit a page written in a data description language and acquire a page from the server;
a generating unit configured to generate a display image based on the page acquired from the server;
a display control unit configured to display the generated display image on the display unit;
a print control unit configured to generate print data for printing the display image generated by the generating unit, if the operation accepting unit accepts a print instruction;
an identifying unit configured to identify whether a first display image appearing on the display unit at a point of time when the operation accepting unit accepts a print instruction is of a first kind for a display of a first type, based on a page corresponding to the first display image; and
an operation determining unit configured to determine whether the operation accepting unit accepts an operation of giving an instruction to enlarge or reduce the first display image while the first display image appears on the display unit, the print control unit being configured to:
generate print data for printing a second display image that corresponds to the first display image and is of a second kind for a display of a second type different from the first type, if the identifying unit identifies the first display image as the first kind, or if the identifying unit does not identify the first display image as the first kind and the operation determining unit determines that an operation of giving an instruction to enlarge or reduce the first display image is not accepted, and
generate print data for printing the first display image, if the identifying unit does not identify the first display image as the first kind and the operation determining unit determines that an operation of giving an instruction to enlarge or reduce the first display image is accepted.

2. The information processing apparatus according to claim 1, wherein
the generating unit is configured to generate the second display image based on the page corresponding to the first display image, if the page corresponding to the first display image includes a description for generating the second display image of the second kind, and the page acquiring unit is configured to acquire a page for generating the second display image of the second kind, if the page corresponding to the first display image does not include a description for generating the second display image of the second kind.

3. The information processing apparatus according to claim 1, wherein the identifying unit is configured to identify the first display image as the first kind if the page corresponding to the first display image includes a description of a predetermined command.

4. The information processing apparatus according to claim 1, wherein the controller further comprises a notification unit configured to notify a user that the second display image different from the first display image is to be printed, if the identifying unit identifies the first display image as the first kind, or if the identifying unit does not identify the first display image as the first kind and the operation determining unit determines that an operation for giving an instruction to enlarge or reduce the first display image is not accepted, and the print control unit is configured to generate print data for printing the second display image on condition that the operation accepting unit accepts permission by the user in response to the notification in the notification step.

5. A printing method performed in a processing apparatus, the processing apparatus comprising an operation accepting unit to accept an operation by a user and a display unit to display an image, the method comprising:

a page acquiring step comprising requesting a server to transmit a page written in a data description language and acquiring a page from the server;

a generating step comprising generating a display image based on the page acquired from the server;

a display control step comprising displaying the generated display image on the display unit;

a print control step comprising generating print data for printing the display image generated in the generating step if the operation accepting unit accepts a print instruction;

an identifying step comprising identifying whether a first display image appearing on the display unit at a point of time when the operation accepting unit accepts a print instruction is of a first kind for a display of a first type, based on a page corresponding to the first display image; and an operation determining step comprising determining whether the operation accepting unit accepts an operation of giving an instruction to enlarge or reduce the first display image while the first display image appears on the display unit, the print control step including:

a step comprising generating print data for printing a second display image that corresponds to the first display image and is of a second kind for a display of a second type different from the first type, if the first display image is identified as the first kind in the identifying step, or if the first display image is not identified as the first kind in the identifying step and it is determined that an operation of giving an instruction to enlarge or reduce the first display image is not accepted in the operation determining step, and a step comprising generating print data for printing the first display image, if the first display image is not identified as the first kind in the identifying step and it is determined that an operation of giving an instruction to enlarge or reduce the first display image is accepted in the operation determining step.

6. The printing method according to claim 5, wherein the generating step comprises a step of generating the second display image based on the page corresponding to the first display image, if the page corresponding to the first display image includes a description for generating the second display image of the second kind, and the page acquiring step comprises a step of acquiring a page for generating the second display image of the second kind, if the page corresponding to the first display image does not include a description for generating the second display image of the second kind.

7. The printing method according to claim 5, wherein the identifying step comprises a step of identifying the first display image as the first kind if the page corresponding to the first display image includes a description of a predetermined command.

8. The printing method according to claim 5, further comprising a notification step comprising notifying a user that the second display image different from the first display image is to be printed, if the first display image is identified as the first kind in the identifying step, or if the first display image is not identified as the first kind in the identifying step and it is determined that an operation for giving an instruction to enlarge or reduce the first display image is not accepted in the operation determining step, wherein the print control step comprises a step of generating print data for printing the second display image on condition that the operation accepting unit accepts permission by the user in response to the notification in the notification step.

9. A non-transitory computer-readable recording medium encoded with a browsing program executable on a computer for controlling an information processing apparatus, the information processing apparatus comprising an operation accepting unit to accept an operation by a user and a display unit to display an image, the program causing the computer to perform:

a page acquiring step comprising requesting a server to transmit a page written in a data description language and acquiring a page from the server;

a generating step comprising generating a display image based on the page acquired from the server;

a display control step comprising displaying the generated display image on the display unit;

a print control step comprising generating print data for printing the display image generated in the generating step, if the operation accepting unit accepts a print instruction;

an identifying step comprising identifying whether a first display image appearing on the display unit at a point of time when the operation accepting unit accepts a print instruction is of a first kind for a display of a first type, based on a page corresponding to the first display image; and an operation determining step comprising determining whether the operation accepting unit accepts an operation of giving an instruction to enlarge or reduce the first display image while the first display image appears on the display unit, the print control step comprising:

a step comprising generating print data for printing a second display image that corresponds to the first display image and is of a second kind for a display of a second type different from the first type, if the first display image is identified as the first kind in the identifying step, or if the first display image is not identified as the first kind in the identifying step and it is determined that an operation of giving an instruction to enlarge or reduce the first display image is not accepted in the operation determining step, and a step comprising generating print data for printing the first display image, if the first display image is not identified as the first kind in the identifying step and it is determined that an operation of giving an instruction to enlarge or reduce the first display image is accepted in the operation determining step.

10. The non-transitory computer-readable recording medium encoded with a browsing program according to claim 9, wherein the generating step comprises a step of generating the second display image based on the page corresponding to the first display image, if the page corresponding to the first display image includes a description for generating the second display image of the second kind, and the page acquiring step comprises a step of acquiring a page for generating the second display image of the second kind, if the page corresponding to the first display image does not include a description for generating the second display image of the second kind.

11. The non-transitory computer-readable recording medium encoded with a browsing program according to claim 9, wherein the identifying step comprises a step of identifying the first display image as the first kind if the page corresponding to the first display image includes a description of a predetermined command.

12. The non-transitory computer-readable recording medium encoded with a browsing program according to claim 9, wherein the program further causes the computer to perform a notification step comprising notifying a user that the second display image different from the first display image is to be printed, if the first display image is identified as the first kind in the identifying step, or if the first display image is not identified as the first kind in the identifying step and it is determined that an operation for giving an instruction to enlarge or reduce the first display image is not accepted in the operation determining step, and the print control step comprises a step of generating print data for printing the second display image on condition that the operation accepting unit accepts permission by the user in response to the notification in the notification step.

* * * * *